United States Patent [19]

Mortberg

[11] Patent Number: 4,587,851
[45] Date of Patent: May 13, 1986

[54] HIGH VACUUM CAPACITANCE MANOMETER HAVING PX SIDE OPEN HOUSING

[76] Inventor: Edward Mortberg, 2 Westgate Dr., #207, Woburn, Mass. 01801

[21] Appl. No.: 705,570

[22] Filed: Feb. 26, 1985

[51] Int. Cl.$^4$ .............................................. G01L 9/12
[52] U.S. Cl. ...................................... 73/724; 361/283; 73/431
[58] Field of Search ......................... 73/718, 724, 431; 361/283

[56] References Cited

U.S. PATENT DOCUMENTS

| | | | |
|---|---|---|---|
| 3,713,341 | 1/1973 | Madsen et al. | 73/715 |
| 3,808,480 | 4/1974 | Johnston | 73/718 |
| 4,380,041 | 4/1983 | Ho | 73/718 |

OTHER PUBLICATIONS

Reliability of a Capacitance Manometer in the Range of $2 \times 10^{-4} - 5 \times 10^{-6}$ Torr., G. Loriot and T. Moran, 140, Rev. Sci. Instrum., vol. 46, No. 2, Feb. 1975.
Modern Capacitance Manometers, John J. Sullivan, 22, Transducer Technology, Jul./Aug. 1979.
Use of the Capacitance Manometer Gauge in Vacuum Freeze-Drying, J. Grant Armstrong, 473, J. Parenteral Drug Assoc., Nov./Dec. 1980.
Catalog/Spec. Sheet for MKS Instruments, Inc.—Baratron 200 Series Differential Transducers.
Catalog/Spec. Sheet for MKS Instruments, Inc.—Pressure and Flow Control Systems for Semiconductor Processing.
Technical note re: Diametrics 600 Sensor Unit in: 103 Control Engineering, Jan. 1985.
Spec. Sheet for Fluid Precision, Inc.—Capacitron Type 150 Absolute Vacuum/Pressure Transducer.

Primary Examiner—Donald O. Woodiel
Attorney, Agent, or Firm—Lahive & Cockfield

[57] ABSTRACT

A sensor unit for a high vacuum manometer includes a tensioned diaphragm fused on one side to a closed evacuated reference chamber and on the other side to a wall ring of substantially the same diameter as the diaphragm. A removable cap member with a gasket seats against the wall so as to define a pressure receiving chamber bordering the diaphragm. With the cap removed, the surfaces of the diaphragm and ring are all accessible for solvent cleaning and visual inspection, so that the sensor may be repeatedly and reliably decontaminated and the diaphragm restored to its initial characteristics. A method of assembly and cleaning are also shown.

8 Claims, 3 Drawing Figures

HIGH VACUUM CAPACITANCE MANOMETER HAVING PX SIDE OPEN HOUSING

DESCRIPTION

BACKGROUND ART

The present invention relates to capacitance manometers, and more particularly to low pressure capacitance manometers having a sealed vacuum reference chamber and designed to operate over a pressure scale having an upper limit in the range of 1–1000 Torr.

Early capacitance manometers, such as shown in U.S. Pat. Nos. 2,999,385 and 2,999,386 issued to Russell Wolfe, utilized a capacitance bridge formed by a movable pressure diaphragm and a pair of electrodes, one spaced on either side of the diaphragm. The diaphragm, electrodes and various spacer or housing elements were clamped together with high-pressure metal clips in a manner to form a reference chamber and a pressure measurement chamber, one on either side of the diaphragm. With such a construction, to measure near 0 Torr., the reference chamber required a continuously operating vacuum pump. More recently, with the advent of processes for welding a tensioned metal diaphragm to the housing, it has become possible to provide a permanently evacuated sealed reference chamber, gettered to provide a near-perfect vacuum.

Modern high-vacuum sensors are constructed with a welded housing having a tensioned diaphragm fused along a centerline thereof, with the gettered, sealed reference vacuum chamber on one side of the diaphragm, and a closed chamber with an inlet tube for connection to the pressure system to be measured on the other side. The diaphragm is generally a stainless steel such as Inconel, which may be obtained in sheet form 0.01 mm. thick, more or less, without microscopic pinholes; the housing is preferably of the same or similar material. The electrode structure is mounted within the vacuum chamber, so that the dialectric is constant and the capacitance of the electrode-diaphragm assembly will be a function only of diaphragm displacement, which, in turn, is indicative of the measured pressure. On a sensor designed for a full-scale pressure of 1 Torr. a displacement as small as $1 \times 10^{-8}$ cm. can be reliably detected by the change in electrode-diaphragm capacitance caused by the displacement.

Such capacitance sensor units have found widespread commercial use for controlling processes in which the pressure must be monitored, such as in sputtering or other etching or thin film fabrication processes, and these sensors may be purchased together with integrally-mounted electronic circuitry for converting the capacitance of the sensor to a voltage signal directly proportional to the pressure. Such auxiliary electronic circuitry typically contains circuitry which compensates for non-linearities of pressure with displacement, and for temperature effects, and, most importantly, which self-zeroes the output for eaoh run. Because of the delicacy of the diaphragm, and the need to absolutely shield the diaphragm from trauma so that its characteristics remain within the range of the auxiliary circuitry, the sensor units for such systems are made as entirely sealed cans with a single tube opening from the Px side, usually via a baffle or porous filter. However, a problem inherent in such sensors is that when used to monitor a process, contaminants gradually build up on the diaphragm and cause displacements which eventually displace the diaphragm beyond the self-zeroing range of the auxiliary circuitry, or alter the displacement curve beyond the compensating range of the circuitry. The sensor must then be discarded and replaced, after a lifetime of a few weeks, and the circuitry re-adjusted to accommodate the thermal and span characteristics of the new sensor unit.

SUMMARY OF THE INVENTION

The present invention solves the foregoing problem by providing a novel sensor for a high vacuum capacitance manometer. A tensioned diaphragm is fused on one side to a closed cup-like chamber evacuated to form a reference chamber, and on the other side to a wall ring of substantially the same diameter as the diaphragm. A removable cap member covers the wall ring, with a gasket between the cap and the ring, thus forming a pressure receiving chamber. Preferably the cap comprises a flat disc with a short guide cylinder extending from a face thereof, the outer diameter of the cylinder being approximately equal to the inner diameter of the ring. The gasket may be an O-ring set in a grove in the cylinder. This housing structure for the sensor permits the pressure receiving chamber to be opened entirely, so that the diaphragm may be both cleaned of accretions using a suitable solvent, and visually inspected for accretions or surface faults. In the preferred embodiment the guide cylinder/O-ring assembly has dimensions which permit assembly to the wall ring by a gentle press fit, so that the cap may be placed in position to seat itself by suction as the pressure on the Px side is drawn down. In this manner the unit is not subjected to any irregular mechanical stress which might injure the diaphragm or distort the electrode geometry.

BRIEF DESCRIPTION OF THE DRAWINGS

These and other features of the invention will be better understood by reference to the drawings, in which.

DETAILED DESCRIPTION

Figure 1:
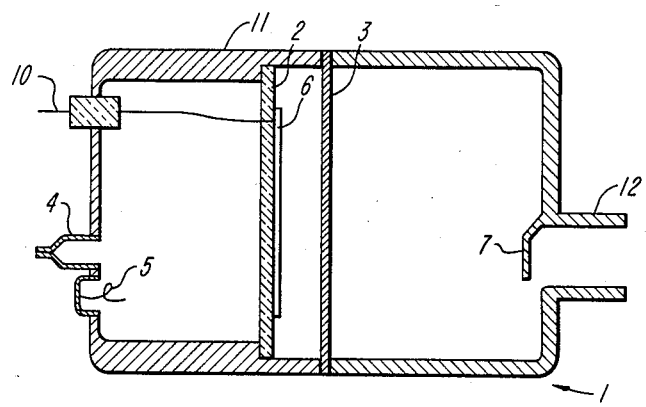
FIG. 1 is a section of a prior art high-vacuum sensor.

FIG. 1 shows a cross-section of a prior art high vacuum sensor unit. Such units have a housing shaped roughly like a cylinder with closed ends, and have a central diaphragm fused under tension around the perimeter of the housing so as to define two sealed chambers. As shown, Sensor 1 includes a housing 11 divided by diaphragm 3 into a first chamber having pressure inlet tube 12 and a second chamber located on the opposing side of the diaphragm. The second chamber is a sealed vacuum reference chamber containing an electrode structure 2, 6 which comprises a metal film deposited on a ceramic plate 2 and fastened within housing 11 at a precisely defined distance from diaphragm 3. A lead connects film 6 to a signal pin 10 passing hermetically through housing 11. An evacuation tube 4 is pinched off after evacuation of the second chamber, and a getter 5 maintains the vacuum. On the other side of diaphragm 3 the housing 11 defines a pressure receiving chamber having an inlet tube 12. A baffle or filter 7 located between tube 12 and diaphragm 3 shields the diaphragm from direct physical trauma, and, to a lesser extent, from diffuse accretions. The diaphragm 3 is welded around its entire perimeter to both halves of the housing 11. The entire housing 11 thus forms a closed welded unitary structure surrounding the diaphragm and defining both the diaphragm tension and the diaphragm-electrode spacing.

Figure 2:
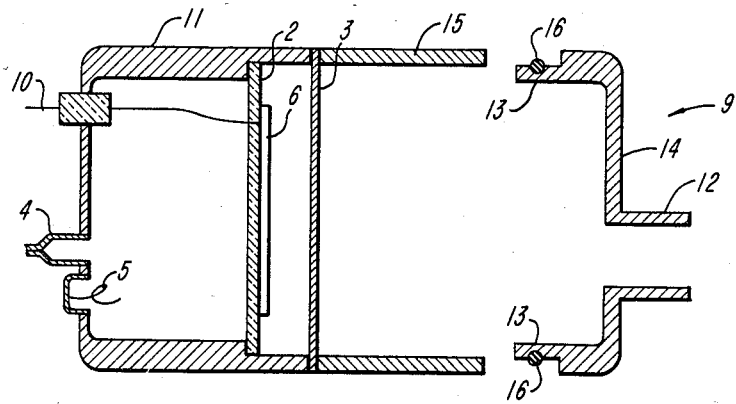
FIG. 2 is a section of a sensor according to the present invention.

FIG. 2 shows the improved high vacuum manometer sensor unit of the present invention. As shown, the left hand, vacuum reference, chamber is attached to the diaphragm and fabricated as in a conventional sensor, with a getter 5, pinch-off tube 4, signal pin 10 and electrode assembly 2,6. On the opposing side of the diaphragm a wall ring 15 having substantially the same diameter as the diaphragm 3 is welded around its circumference to the diaphragm so as to form an extension of the reference chamber housing.

Unlike the prior art systems, however, the right hand, pressure receiving, chamber is not a closed welded chamber, but comprises, in addition to the diaphragm 3 and wall ring 15, a cap member 9 removably hermetically mountable thereto.

Cap member 9 in a preferred embodiment comprises a face plate 14 having an inlet tube 12 formed therein, and a guide cylinder 13 centrally extending from a side of the face plate. Guide cylinder 13 is of a diameter to snugly fit within wall ring 15. A seal 16, of viton, soft copper, or other vacuum-compatible gasket material fits between cap 9 and ring 15 so as to provide a vacuum-tight seal for the chamber defined by elements 3, 15 and 9. In the embodiment shown, seal 16 is an O-ring fitted in a semi-circular retaining groove formed in guide cylinder 13. Baffles similar to 7 of FIG. 1 may be provided.

Assembly of the cap to the remaining structure is accomplished as follows. Guide cylinder 13 is inserted in wall ring 15 and seal 16 brought up against ring 15. Tube 12 is then connected to an evacuation pump or to the system being monitored, so as to draw down the pressure in the chamber formed by elements 3, 15 and 9. The resultant pressure differential then pops the cap 9 into a firmly seated position. In this manner the unit may be assembled without the application of localized mechanical forces, which could distort the diaphragm's tension or pressure/displacement characteristics.

Disassembly may be manually accomplished once the pressure in the pressure receiving chamber 3, 15, 9 is allowed to rise to ambient.

With the cap removed, the disassembled structure has an entirely exposed Px side of the diaphragm, inset within ring 15. Unlike the prior art devices in which the pressure chamber geometry prevented flushing, cleaning or inspection of the diaphragm, the present structure permits simple cleaning of deposits from the diaphragm and pressure chamber by solvent and/or ultrasonic cleansing, and visual inspection thereof.

Figure 3:
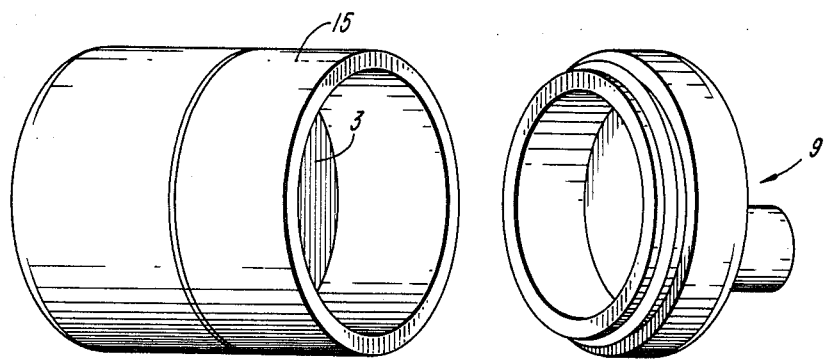
FIG. 3 is a perspective view of the sensor of FIG. 2 with the cap removed.

FIG. 3 shows a perspective view of a sensor unit according to the present invention with its cap removed. Wall ring 15 has a depth of approximately 0.5–2.0 cm. and cap 9 has a diameter of approximately 4–10 cm. It will be appreciated that the open cap construction defined by diaphragm 3 and wall ring 15 has no inaccessible surfaces, so that deposits may be solvent-loosened, and flushed without the risk of leaving particulate clumps on the diaphragm or in recesses. In addition, the more heavily contaminated upstream components of cap 9 with inlet 12, are entirely separable from the sensor unit, and are mechanically robust, so that they may be cleaned by thermal or mechanical means, in addition to solvent cleansing.

In this manner the sensor of the present invention may be non-destructively cleansed of accretions deposited during use, in such a manner as to restore the properties of the diaphragm to substantially their initial values, or to permit the use of the sensor in an entirely different environment without cross-contamination.

It will be appreciated that while the invention has been described with reference to a particular embodiment, such description is by way of illustration only, and the invention is not limited to the embodiment illustrated. The vacuum sensor unit with open Px side housing, having been thus disclosed, may be realized in a variety of other constructions, as will occur to persons skilled in the art, and all such variations are included within the scope of the invention, as defined by the following claims.

What is claimed is:

1. A sensor unit for a high vacuum capacitance manometer, of the type having an integral vacuum reference chamber, such unit comprising:
   a diaphragm having first and second sides and a periphery;
   a reference chamber fused to the diaphragm along its periphery on the first side, and including an electrode and means for securing said electrode in a fixed position with respect to the diaphragm;
   a wall ring fused to the diaphragm along its periphery on the second side and extending outwardly therefrom to an outer edge; and
   cap means for removably capping the wall at its outer edge so as to provide a closed pressure receiving chamber with the second side of the diaphragm constituting an inner surface thereof, such cap means being non-destructively removable so as to provide, when removed, access to substantially the entire second side of the diaphragm for cleaning and visual inspection thereof.

2. A sensor according to claim 1, wherein the cap means includes pressure actuated vacuum sealing means, for effecting, under the influence of a pressure decrease in the pressure receiving chamber, a vacuum-tight fit of the cap to the wall.

3. A sensor according to claim 2, wherein the wall has a cylindrical inner profile, and the cap includes a cylindrical guide member mating with the inner profile for guiding the cap into position at the outer edge of the wall, and further includes a seal between the cap and the wall, so that drawdown of the pressure in the pressure receiving chamber advances the cylinder within the wall to compress the seal and form said vacuum-tight seal.

4. A sensor according to claim 3 wherein the cylindrical guide member includes an annular groove therein, and wherein the seal is an O-ring located in the groove.

5. A sensor according to claim 1 wherein the diaphragm is a tensioned metal diaphragm and wherein the reference chamber is a vacuum chamber.

6. A sensor according to claim 1, wherein the cap means has inner and outer faces, and further includes conduit means, communicating with the inner face of the cap and extending from the outer face thereof, for conducting the pressure of an outside pressure source to the closed pressure receiving chamber.

7. A sensor according to claim 1, wherein the wall ring comprises an inner wall surface along its outer edge, and wherein the cap means comprises a plug, having an outer surface mating with the inner surface, for removably capping the wall by plugging it.

8. A sensor according to claim 7, wherein the plug includes a recess in its outer surface, and the cap means further includes a gasket located in the recess, so as to provide a vacuum-tight fit of the plug to the wall.

* * * * *